US008126051B2

(12) United States Patent
Dufour et al.

(10) Patent No.: US 8,126,051 B2
(45) Date of Patent: Feb. 28, 2012

(54) VIDEO ENCODING AND DECODING METHODS AND CORRESPONDING ENCODING AND DECODING DEVICES

(75) Inventors: Cécile Dufour, Paris (FR); Gwenaëlle Marquant, Liffre (FR); Stéphane Valente, Paris (FR)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1268 days.

(21) Appl. No.: 10/555,262

(22) PCT Filed: Apr. 28, 2004

(86) PCT No.: PCT/IB2004/001373
§ 371 (c)(1),
(2), (4) Date: Nov. 1, 2005

(87) PCT Pub. No.: WO2004/100553
PCT Pub. Date: Nov. 18, 2004

(65) Prior Publication Data
US 2007/0140331 A1 Jun. 21, 2007

(30) Foreign Application Priority Data

May 6, 2003 (EP) .................................. 03300011

(51) Int. Cl.
*H04N 7/12* (2006.01)
(52) U.S. Cl. ................................... 375/240.12
(58) Field of Classification Search ............ 375/240.01–240.29; 382/232–253; 348/390.1–430.1
See application file for complete search history.

(56) References Cited

U.S. PATENT DOCUMENTS
6,005,980 A * 12/1999 Eifrig et al. ............... 382/236
(Continued)

FOREIGN PATENT DOCUMENTS
CN          1334654        2/2005
(Continued)

OTHER PUBLICATIONS

PCT/IB2004/001373 International Search Report dated Aug. 2, 2004 (4 pgs.).
PCT/IB2004/001373 International Search Report dated Aug. 2, 2004 (3 pgs.).
"Munich Metting of MPEG-4 Working Group. Report ISO/IEC JTC1/SC29/WG11 MPEG4/N1172", International Organization for Standardization, 1996, pp. 3-49, XP002047798.

(Continued)

*Primary Examiner* — Sherali Ishrat
(74) *Attorney, Agent, or Firm* — DLA Piper LLP (US)

(57) ABSTRACT

An encoding method applied to an input video sequence corresponding to successive scenes subdivided into successive video object planes (VOPs) is provided that generates, for coding all the video objects of said scenes, a coded bit stream the content of which is described in terms of separate channels and constituted of encoded video data in which each data item is described by a bitstream syntax that allows the recognition and decoding of all the elements of the content. The syntax comprises an additional syntactic information provided for describing independently the type of temporal prediction of the various channels. The additional information is a syntactic element placed at the slice level or the macroblock level in the coded bitstream, and its meaning is either specific for each present channel or shared by all existing channels.

7 Claims, No Drawings

U.S. PATENT DOCUMENTS

| | | | |
|---|---|---|---|
| 6,043,846 A * | 3/2000 | Shen et al. | 348/409.1 |
| 6,108,449 A * | 8/2000 | Sekiguchi et al. | 382/236 |
| 6,192,080 B1 * | 2/2001 | Sun et al. | 375/240.16 |
| 6,404,813 B1 * | 6/2002 | Haskell et al. | 375/240.12 |
| 6,775,326 B2 * | 8/2004 | Sekiguchi et al. | 375/240.14 |
| 6,862,320 B1 * | 3/2005 | Isu et al. | 375/240.27 |
| 6,895,994 B2 | 5/2005 | Zeng | 137/460 |
| 6,898,246 B2 | 5/2005 | Katayama | 375/240.25 |
| 7,643,559 B2 * | 1/2010 | Kato et al. | 375/240.23 |
| 2003/0048845 A1 * | 3/2003 | Le Maguet | 375/240.08 |
| 2003/0215011 A1 * | 11/2003 | Wang et al. | 375/240.03 |

FOREIGN PATENT DOCUMENTS

| | | |
|---|---|---|
| CN | 1213246 | 8/2005 |
| EP | 0891093 | 1/1999 |
| EP | 0959628 | 11/1999 |
| WO | WO 03/034743 | 4/2003 |
| WO | WO 2004/100553 | 11/2004 |

OTHER PUBLICATIONS

Ebrahimi, T: "MPEG-4 Video Verification Model: A video encoding/decoding algorithm based on content representation", Signal Processing. Image Communication, Elservier Science Publishers, Amsterdam, NL.

*Content-Based Encoding/Decoding Algorithms in MPEG-4 Video Verification Model,* English Translation, TV Technology, vol. 202, pp. 28-33, Apr. 30, 1993.

*H.26L Test Model Long Term No. 5(TML—ITU—Telecommunications 5)—Draft 0,* Standardization Sector, Eleventh Meeting: Portland, Oregon, USA, Aug. 22-25, 2000.

*Information Technology—Coding of Audio-Visual Objects—Part 2: Visual,* ISO/IEC JTC 1/SC 29/WG 11, Maui, Dec. 1999, Document available at ISO, referred under the MPEG-4.

* cited by examiner

VIDEO ENCODING AND DECODING METHODS AND CORRESPONDING ENCODING AND DECODING DEVICES

PRIORITY CLAIMS/RELATED APPLICATIONS

This application is a 371 U.S. national stage filing of (and claims the benefit and priority under 35 USC 119 and 120 to) PCT/IB2004/00 1373 filed on Apr. 28, 2004 which in turn claims the benefit and priority under 35 USC 119 to European Patent Application Serial No. EP 03300011.8 filed on May 6, 2003, the entirety of both of which are incorporated by reference herein.

FIELD OF THE INVENTION

The present invention generally relates to the field of video compression and, for instance, to the video coding standards of the MPEG family (MPEG-1, MPEG-2, MPEG-4) and to the video recommendations of the ITU-H.26X family (H.261, H.263 and extensions, H.264). More specifically, this invention relates to an encoding method applied to an input video sequence corresponding to successive scenes subdivided into successive video object planes (VOPs) and generating, for coding all the video objects of said scenes, a coded bitstream the content of which is described in terms of separate channels and constituted of encoded video data in which each data item is described by means of a bitstream syntax allowing to recognize and decode all the elements of said content, said syntax comprising an additional syntactic information provided for describing independently the type of temporal prediction of the various channels, said predictions being chosen within a list comprising the following situations:
- the temporal prediction is formed by directly applying the motion field sent by the encoder on one or more reference pictures;
- the temporal prediction is a copy of a reference image;
- the temporal prediction is formed by the temporal interpolation of the motion field;
- the temporal prediction is formed by the temporal interpolation of the current motion field and further refined by the motion field sent by the encoder.

The invention also relates to a corresponding encoding device, to a transmittable video signal consisting of a coded bitstream generated by such an encoding device, and to a method and a device for decoding a video signal consisting of such a coded bitstream.

BACKGROUND OF THE INVENTION

In the first video coding standards and recommendations (up to MPEG-4 and H.264), the video was assumed to be rectangular and to be described in terms of a luminance channel and two chrominance channels. With MPEG-4, an additional channel carrying shape information has been introduced. Two modes are available to compress those channels: the INTRA mode, according to which each channel is encoded by exploiting the spatial redundancy of the pixels in a given channel of a single image, and the INTER mode, that exploits the temporal redundancy between separate images. The INTER mode relies on a motion-compensation technique, which describes an image from one or several image(s) previously decoded by encoding the motion of pixels from one image to the other. Usually, the image to be encoded is partitioned into independent blocks or macroblocks, each of them being assigned a motion vector. A prediction of the image is then constructed by displacing pixel blocks from the reference image(s) according to the set of motion vectors (luminance and chrominance channels share the same motion description). Finally, the difference (called the residual signal) between the image to be encoded and its motion-compensated prediction is encoded in the INTER mode to further refine the decoded image. However, the fact that all pixel channels are described by the same motion information is a limitation damaging the compression efficiency of the video coding system.

SUMMARY OF THE INVENTION

It is therefore the object of the invention to propose a video encoding method in which said drawback is avoided by adapting the way the temporal prediction is formed.

To this end, the invention relates to a method such as defined in the introductory part of the description and which is moreover characterized in that said additional syntactic information is a syntactic element placed in said generated coded bitstream and its meaning is specific for each present channel, said element being placed at the slice level or at the macroblock level according to the proposed embodiment.

The invention also relates to a corresponding encoding device, to a transmittable video signal consisting of a coded bitstream generated by such an encoding device, and to a method and a device for decoding a video signal consisting of such a coded bitstream.

DETAILED DESCRIPTION OF THE INVENTION

According to the invention, it is proposed to introduce in the encoding syntax used by the video standards and recommendations an additional information consisting of a new syntactic element supporting their lack of flexibility and opening new possibilities to encode more efficiently and independently the temporal prediction of various channels. This additional syntactic element, called for example "channel temporal prediction", takes the following symbolic values:
Motion_compensation
Temporal_copy
Temporal_interpolation
Motion_compensated_temporal_interpolation,
and the meaning of these values is:

a) motion_compensation: the temporal prediction is formed by directly applying the motion field sent by the encoder on one or more reference pictures (this default mode is implicitly the INTER coding mode of most of the current coding systems);

b) temporal_copy: the temporal prediction is a copy of a reference image;

c) temporal_interpolation: the temporal prediction is formed by the temporal interpolation of the motion fields;

d) motion_compensated_temporal_interpolation: the temporal prediction is formed by the temporal interpolation of the current motion field and further refined by the motion field sent by the encoder.

The words "temporal interpolation" must be understood in a broad sense, i.e. as meaning any operation of the type defined by an expression such as $Vnew = a \cdot V1 + b \cdot V2 + K$, where V1 and V2 designate previously decoded motion fields, a and b designate coefficients respectively assigned to said motion fields, K designates an offset and Vnew is the new motion field thus obtained. It can therefore be seen that, in fact, the particular case of the temporal copy is included in the more general case of the temporal interpolation, for b=0 and K=0 (or a=0 and K=0).

According to the invention, the additional syntactic element thus proposed has to be placed at the following levels in the coded bitstream that has to be stored (or to be transmitted to the decoding side):
1) either at the slice level;
2) or at the macroblock level;
this additional syntactic element being in each case either specific for each present channel or, possibly, shared by all the channels.

This invention may be used in some identified situations where the way of constructing the temporal prediction can be switched on a slice or macroblock basis, and also on a channel basis. A first example may be for instance a sequence with a shape channel: it is possible that the shape information does not change much, whereas the luminance and chrominance channels carry varying information (it is for instance the case with a video depicting a rotating planet: the shape is always a disc, but the texture of it depends on the planet rotation). In this situation, the shape channel can be recovered by temporal copy, and the luminance and chrominance channels by motion compensated temporal interpolation. A second example may be the case of a change at the macroblock level. In a video sequence showing a seascape with the sky in the upper part of the picture, unlike the sea, the sky remains the same from one image to the other. Its macroblocks can therefore be encoded by temporal copy, whereas the macroblocks of the sea have to be encoded by temporal interpolation.

The invention claimed is:

1. An encoding method applied to an input video sequence corresponding to successive scenes subdivided into successive video object planes (VOPs), the method comprising:
generating a coded bitstream for coding all the video objects of said scenes, the content of the coded bitstream is described in terms of separate channels and constituted of encoded video data in which each data item is described by means of a bitstream syntax allowing recognition and decoding of all the elements of said content, wherein the coded bitstream further comprises additional syntactic information provided for describing independently for each channel the type of temporal prediction for that channel, the type of temporal predictions being chosen from a list comprising the following situations:
the temporal prediction is formed by directly applying the motion field sent by the encoder on one or more reference pictures;
the temporal prediction is a copy of a reference image;
the temporal prediction is formed by the temporal interpolation of the motion field;
the temporal prediction is formed by the temporal interpolation of the current motion field and further refined by the motion field sent by the encoder; and
wherein the additional syntactic information is a syntactic element placed at a selected level in said generated coded bitstream and its meaning is specific for each present channel.

2. The method of claim 1, wherein the selected level is a macroblock level.

3. An encoding method according to claim 1, characterized in that said meaning is shared by all existing channels.

4. An encoding device, comprising:
means for processing an input video sequence that corresponds to successive scenes subdivided into successive video object planes (YOPs); and
means for generating a coded bitstream, the content of the coded bitstream is described in terms of separate channels and constituted of encoded video data in which each data item is described by means of a bitstream syntax allowing recognition and decoding of all the elements of said content, wherein the coded bitstream further comprises additional syntactic information provided for describing independently for each channel the type of temporal prediction for that channel, the type of temporal predictions being chosen from a list comprising the following situations:
the temporal prediction is formed by directly applying the motion field sent by the encoder on one or more reference pictures;
the temporal prediction is a copy of a reference image;
the temporal prediction is formed by the temporal interpolation of the motion field;
the temporal prediction is formed by the temporal interpolation of the current motion field and further refined by the motion field sent by the encoder; and
wherein the additional syntactic information is a syntactic element placed at a selected level in said generated coded bitstream and its meaning is specific for each present channel.

5. The method of claim 1, wherein the selected level is a slice level.

6. The method of claim 1 further comprising encoding a shape channel using the temporal prediction that is a copy of a reference image and encoding a luminance channel and a chrominance channel using motion compensated temporal interpolation.

7. The method of claim 1 further comprising encoding a first portion of the video input sequence using the temporal prediction that is a copy of a reference image and encoding a second portion of the of the video input sequence using motion compensated temporal interpolation.

* * * * *